Patented Jan. 8, 1935

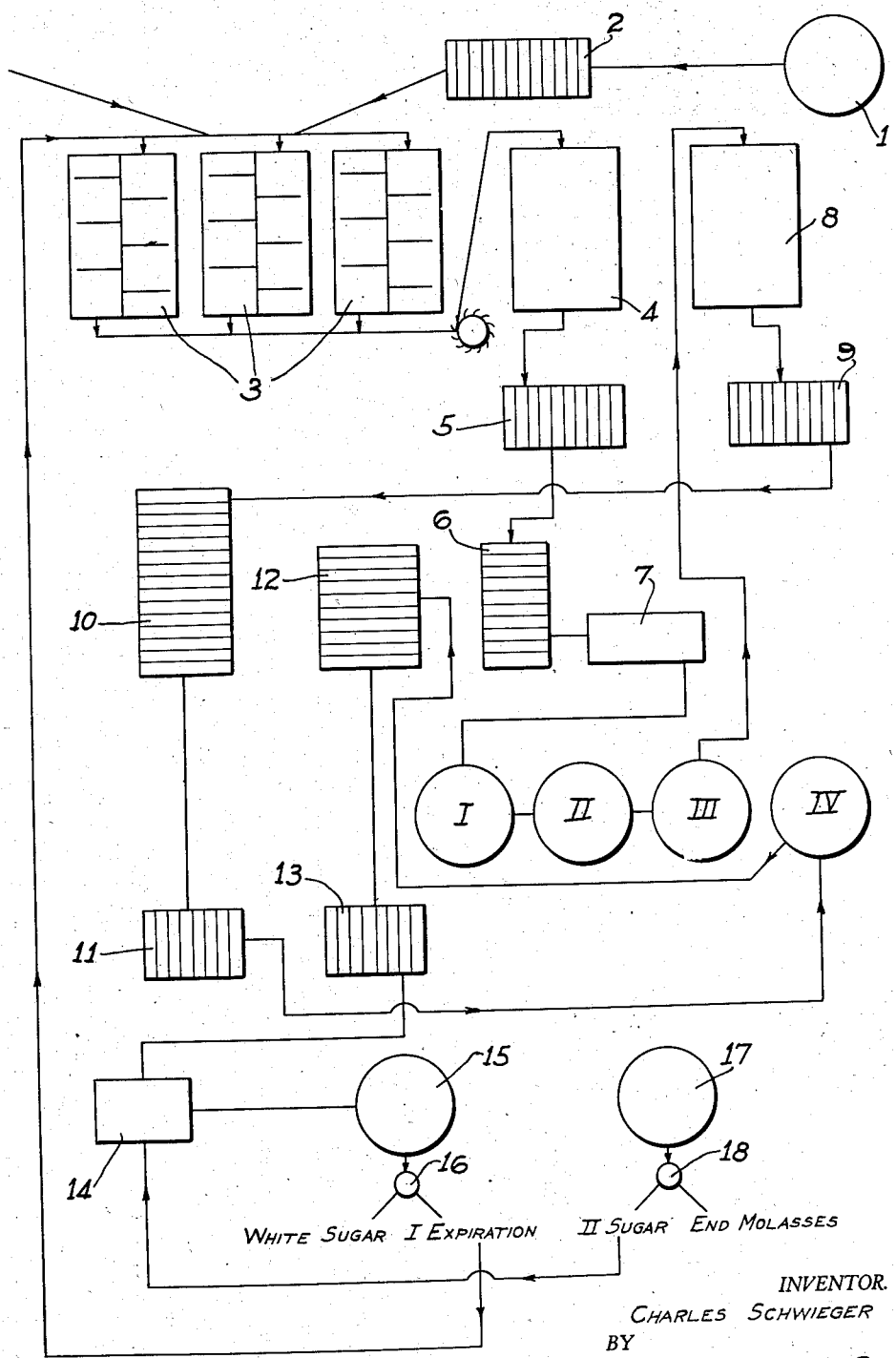

1,986,858

UNITED STATES PATENT OFFICE 1,986,858

MANUFACTURE OF SUGAR

Charles Schwieger, deceased, late of Lage, Germany, by Alfred Schwieger, administrator, San Francisco, Calif., by decree of court and mesne assignments, to Schwieger Chemical Co., Inc., San Francisco, Calif., a corporation of California Application October 7, 1930, Serial No. 487,074

5 Claims. (Cl. 127—50)

The present invention relates to improvements in the manufacture of sugar, and is a continuation in part of the co-pending application Serial No. 217,884 filed September 6, 1927. The principal object of the invention is to provide an improved process which allows the amount of high grade sugar gained from a given quantity of raw material to be increased at the expense of the residue of molasses. A further object of the present invention is to provide certain departures from the process conventionally employed and to make certain changes in the succession of the steps whereby the entire process is rendered much more economical than was possible with the methods previously employed. Further objects and advantages will appear as the specification proceeds.

The preferred method of carrying out the invention is illustrated in the accompanying drawing, in which:

Figure 1 schematically illustrates the various steps followed in the process.

Referring to the drawing in detail, the sugar beets are first sliced or shredded and treated for extraction of the raw juice in the diffusion cells indicated at 1 in the manner now commonly employed in sugar beet factories. It should be noted at this point that the principal steps of the process apply to the manufacture of cane sugar as well as of beet sugar, and if it is to be used in connection with the manufacture of cane sugar, the raw juice may be produced in the manner commonly employed for extracting the same from sugar cane.

From the diffusion cells the raw juice passes through the conventional measuring tank 2 preferably at a temperature of sixty-two degrees centigrade and is measured into one of the three tanks 3 which may be referred to as the lime separation tanks. In these tanks the raw sugar juice is mixed with lime, preferably in the proportion of from 1¾% to 2½% of CaO in the case of beet sugar juice and of from 1½% to 2% of CaO in the case of cane sugar juice. Ammonium carbonate preferably from 65 to 75 grams per 250 cubic feet of raw juice is added, and furthermore from 25% to 50% of the green syrup is added gained from a previous process and taken therefrom at a stage which will be mentioned later. It should be observed that the addition of this green syrup does not essentially affect the treatment of the raw juice but serves only the purpose of further extracting sugar from the added green syrup which thus partakes of a second complete process. The mixture thus obtained is kept at a temperature of substantially ninety degrees centigrade and is agitated for a period of about fifteen minutes.

From the lime separation tanks the juice thus treated is pumped into the first carbonation tank indicated at 4 where it is subjected to a process of carbonation, the latter process being carried out in such a manner that it results in an alkalinity of the mixture of from .15% CaO to .05% CaO, the best percentage of alkalinity within the range indicated depending upon the sugar content of the beets and other conditions to be established by experiment in the individual case. From the first carbonization tank the juice is passed in a conventional manner through the heater 5 and is filtered in the first filtration presses 6. From the filter presses the thin juice passes into the chemical tank 7 where it again is treated with ammonium carbonate preferably in the proportion of 65 to 75 grams of ammonium carbonate to 250 cubic feet of juice and is agitated for from two to four minutes preferably at a temperature of ninety degrees centigrade, whereupon it is successively passed through the evaporators marked I, II and III so as to go through three stages of evaporation. From the third evaporator the thickened juice is conducted into the second carbonation tank 8 where the juice is treated to a second carbonation with a resulting alkalinity of .02% CaO to .04% CaO.

From the second carbonation tank the juice passes through the second presses indicated at 9, to the first sulfitation tank 10 in which sulfitation is carried on in the conventional manner.

From the first sulfitation tank the juice then passes through a third filtration press 11 and into the fourth evaporator marked IV, where it is further evaporated in accordance with conventional methods. The thick juice then passes through a second stage of sulfitation in the tank 12, and the fourth filtration press 13 into the thick juice tank 14. From this tank it passes through the conventional vacuum pan 15 and the centrifugal separator 16 which separates the white sugar from the molasses. From 25% to 50% of the molasses is returned to the first lime separation tanks for the purposes set forth at the beginning of the specification, while the remainder of the molasses is conducted for further treatment to the second vacuum pan 17 and to the second centrifugal separators 18 with a resulting separation into second product sugar and end molasses. The second product sugar may be carried back to the tank 14 for further treatment with the contents of said tank.

It should be understood that suitable equivalents may be used for the various elements set forth hereinabove and more particularly that ammonium bicarbonate is to be considered the full equivalent of ammonium carbonate.

What is claimed is,

1. In the process of manufacturing sugar, the method of subjecting the raw juice to a process of lime separation and a process of carbonation with a resulting alkalinity of from .15 to .05 CaO and in treating the resulting mixture with ammonium carbonate by adding ammonium carbonate at the rate of from 65 to 75 grams per 250 cubic feet of mixture.

2. In the process of manufacturing sugar, the method of subjecting the raw juice to a process of lime separation in the presence of ammonium carbonate, to a process of carbonation with a resulting alkalinity of from .15 to .05 CaO and in treating the resulting mixture with ammonium carbonate by adding ammonium carbonate at the rate of from 65 to 75 grams per 250 cubic feet of mixture.

3. In the process of manufacturing sugar the method of subjecting raw juice to lime separation in the presence of ammonium carbonate, then to a process of carbonation, of heating and filtering the resulting juice, of treating the latter with ammonium carbonate and thereafter partly evaporating the juice, of subjecting the partly evaporated juice to a second stage of carbonation, of filtering the resulting juice and subjecting the same to a process of sulfitation, of again filtering the resulting juice and of subjecting the same to a final evaporation.

4. In the process of manufacturing sugar the method of subjecting raw juice to lime separation, then to a process of carbonation, of heating and filtering the resulting juice, of treating the latter with ammonium carbonate and thereafter partly evaporating the juice, of subjecting the partly evaporated juice to a second stage of carbonation, of filtering the resulting juice and subjecting the same to a process of sulfitation, of again filtering the resulting juice and of subjecting the same to a final evaporation.

5. The process of manufacturing sugar which comprises the steps of subjecting raw juice in the presence of green syrup and ammonium carbonate to lime separation, then to a process of carbonation with a resulting alkalinity of .15 to .05%, of filtering the resulting juice, of treating the latter with ammonium carbonate and thereafter partly evaporating the juice, of subjecting the partly evaporated juice to a second stage of carbonation with a resulting alkalinity .02% to .04%, of filtering the resulting juice and of subjecting the filtered juice to a final evaporation.

ALFRED SCHWIEGER,
*Administrator of the Estate of Charles Schwieger, Deceased.*